Feb. 8, 1938. E. L. WOOD 2,107,406
FILTER
Original Filed May 6, 1936
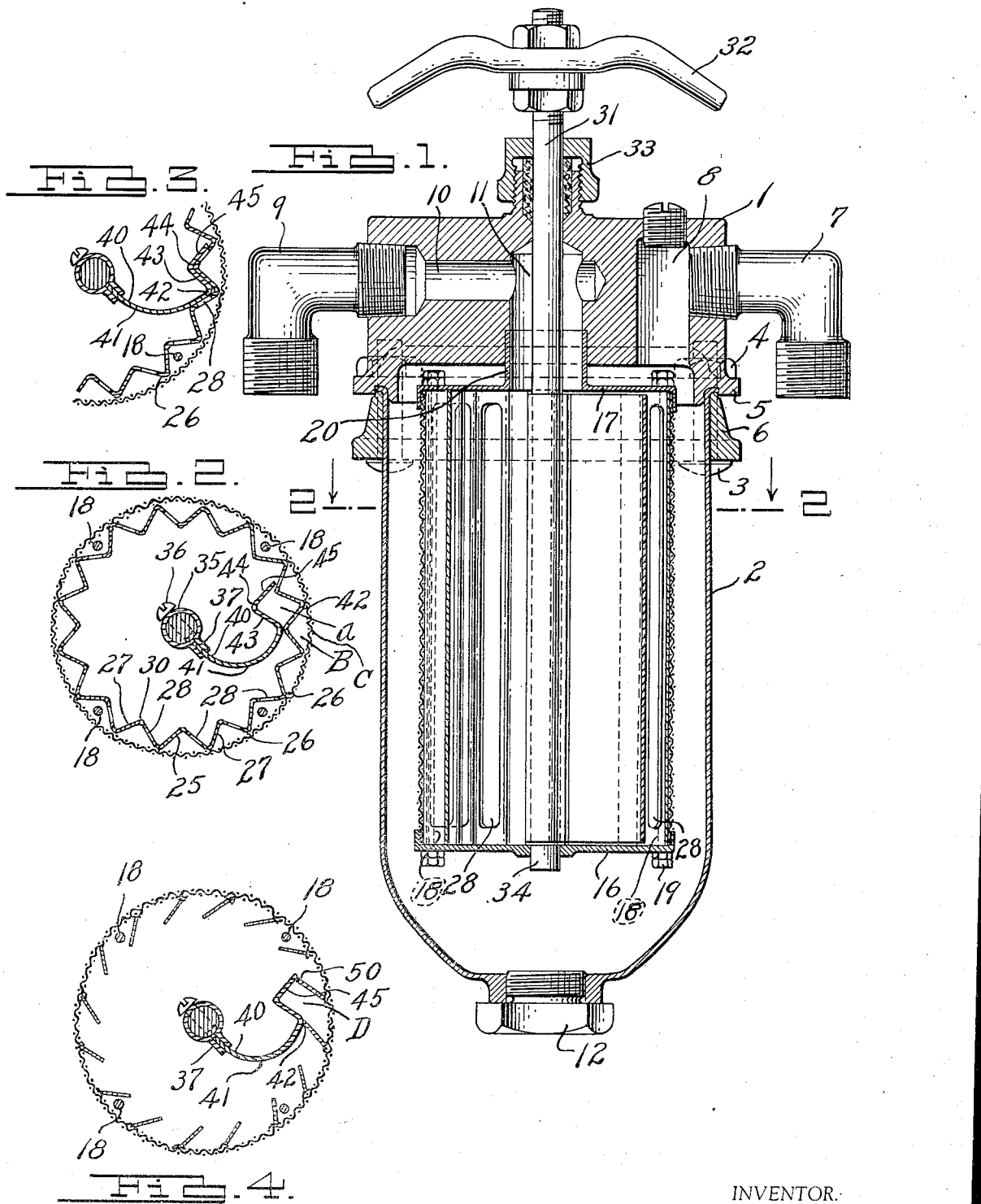
INVENTOR.
Edward L. Wood
BY Barnes, Kisselle, Laughlin & Raisch
ATTORNEY.

Patented Feb. 8, 1938

2,107,406

UNITED STATES PATENT OFFICE 2,107,406

FILTER

Edward L. Wood, Detroit, Mich.

Application May 6, 1936, Serial No. 78,199
Renewed June 29, 1937

8 Claims. (Cl. 210—167)

This invention relates to a device for filtering fluids, and particularly liquids.

The general object is to provide a filter for filtering out extraneous substances from a liquid, and which incorporates a self-cleaning arrangement whereby the filtering medium or element may be cleaned while the device is in use, to the end that the filter may be used over extended periods without requiring disassembly for cleaning purposes. Such a device is useful in many places and for various purposes, some of which are as follows: for the filtering of lubricating oil for internal combustion engines; for automotive vehicles of the passenger or commercial type, or for stationary engines; for the filtering of fuel oil used for oil burners or the like; for the filtering of hydrocarbon fuel for engines, for the filtering of oil used on industrial machines, such as grinders, lathes, and for such machines which perform such operations as milling, cutting, broaching or other operations.

In carrying out the invention, a filtering element is preferably located in a chamber through which the liquid flows, with the filtering element arranged so that the liquid must flow therethrough. The particles to be filtered are caught or collected on the filter on the entrance side of the medium. Provision is made for forcing some of the liquid reversely through zones or sections of the filter, the arrangement being preferably that this reverse flow of some of the liquid takes place only through a portion of the filter at any given time, which portion may be one or more of said zones or sections, thus leaving the other portions of the filtering medium comprising other zones or sections to function in the usual filtering manner with the liquid flowing therethrough. To this end means are provided for substantially dividing off the filtering medium in zones or sections so that the reverse flow of the liquid through the medium is confined to one or more of said zones or sections. The operation of the device in the cleansing action may be controlled by hand or arranged to be operated automatically, as best fits the needs of the particular installation and type of work being performed.

In the drawing:

Fig. 1 is a sectional view taken through a device constructed in accordance with the invention.

Fig. 2 is a cross-sectional view taken substantially on line 2—2 of Fig. 1.

Fig. 3 is a sectional view similar to Fig. 2 showing the parts in a different position.

Fig. 4 is a sectional view similar to Fig. 2 showing a modified form of the invention.

The drawing illustrates one type of device in which the invention may be incorporated. In the drawing the device comprises a casing which may take the form of a head 1 and a hollow case member 2 secured thereto preferably in a removable manner. For this purpose the head and casing may have projecting parts through which bolts 3 may be passed for the reception of nuts 4. The projection 5 on the head may be integral therewith, while a flange or ring 6 may be placed around the casing member 2 and which carries the projections.

The fluid to be filtered passes through this casing structure; the head may be equipped with an inlet fitting 7 leading into a bore 8 in the head; the head may have an outlet fitting 9 which communicates into a bore 10 in the head, in turn communicating into a bore 11 in the head; the bores 8 and 11 open through the lower face of the head into the shell 2. Thus a fluid passing in through the passageway 8 is directed into the shell and then may pass out through the passageway 11 and fitting 9.

A filtering medium is located in the shell 2, and since the filtered material is caught in the shell, the shell may have a removable clean-out plug 12. As shown herein this filtering medium takes the form of a screen 15 which may be of hollow cylindrical shape closed at its lower end by a plate 16; and it may be closed at its upper end by an end plate 17. For reenforcing this structure, rods 18 may extend from one plate to another and may hold the plates clamped against the ends of the cylindrical screen by nuts 19. Preferably the plates are flanged for fitting over the ends of the tubular screen. This filtering structure is preferably attached to the head 1, and this may be accomplished in any suitable manner; and as shown herein the plate 17 has a central projection 20 which may be tightly fitted in an enlarged portion of the passageway 11. This tight or press fit may be all that is necessary, although other attaching means may be used if desired.

According to this structure it will be noted that the fluid entering through the passageway 8 descends into the shell 2. In the normal course of the operation the fluid may be passed through the device under some pressure, and the shell 2 is substantially filled with the fluid. The fluid must then pass through the screen 15 to the interior of the cylindrical screen from where it may pass out through the outlet passageways 10 and 11 and fitting 9. Where the device, for example, is used on an engine the lubricating oil may be pumped through the device, it being understood that there are suitable conduits or pipes connected to the fittings 7 and 8, and with the head preferably relatively permanently mounted in position. The screen 15 may advantageously be a metallic screen of any desired mesh, preferably very fine, although the size of the mesh may vary with different installations and uses. Although the filtering medium is termed a screen, it may be of other material such as a non-metallic substance or a woven or felt cloth fabric. However, of the filtering substances now known to applicant the metallic screen is preferred, although the invention may be used with improved filtering mediums now known to others, or which may later be developed, as this invention resides primarily in the self-cleansing arrangement.

It will be observed that the substance to be filtered in the liquid will be caught by the screen and may collect on the outside surfaces of the cylindrical form. This may be termed the incoming side of the filter. The arrangement for cleaning the filter is preferably disposed on the opposite side thereof or on the outgoing side, and it functions to force some of the liquid through the filtering medium in a reverse direction. For this purpose, means are provided for substantially dividing the filtering medium on its outgoing side into zones or sections. One of such means may take the form of a member of corrugated or serpentine form, as shown in Fig. 2. This member may be of sheet metal and is generally indicated at 25. The bottom of each furrow or valley, as at 26, substantially contacts with the filtering medium so that between each point of contact is a section of filtering medium divided off from the remaining portion of the medium by such contact. One wall of each valley is of solid construction, as shown at 27, while the other wall is open as illustrated at 28. The walls 27 and 28 meet and form a fairly abrupt peak or apex as at 30. This member 25 extends preferably throughout the length of the cylindrical filtering medium and substantially contacts with the end plates 16 and 17, as shown in Fig. 2. In the form shown herein the filtering medium and the member 25 are fixed relative to each other, that is to say, they have no relative movement in the normal operation of the device.

Journaled substantially on the axis of the medium is an operating shaft 31 which may be provided with a suitable device 32, by means of which it may be rotated. This shaft extends through the head 1 and may be sealed by a packing-gland 33, and its lower end, as at 34, may be journaled in the plate 16. Mounted for rotation in connection with the shaft 31 is a spring actuated member arranged to wipe the member 25 and to successively be flexed and to snap over the apices 30. For this purpose the shaft 31 may be provided with a sleeve 35 mounted over the same and held thereto, as for example, by one or more screws 36; and the member 35 may have two projecting parts or wings 37. The spring actuated member may be of one-piece construction formed of suitable spring metal, and it is generally indicated at 40. The body of this member may advantageously be of curved form, as shown at 41. One edge is designed to be placed between the wings 37. This may be a relatively loose or easy fit so that in making an assembly the member 40 may merely be slipped into position. In the event the member 40 becomes defective or some other repairs need to be made to the device, it may be easily slipped out of position and another replaced if necessary.

It will be observed that as the shaft 31 is rotated the member 40 is carried along with the shaft, and its outer end is arranged to wipe across the member 25. This end is specially shaped, the same having a bend line 42, a wall portion 43, a bend line 44, and a terminating wall portion 45. The normal or static condition of the parts is indicated in Fig. 3 where it will be noted that the bend 44 lies over an apex and the wall portion 45 substantially abuts against an open wall 28. As the shaft is rotated the end portion 45 wipes across the open wall portion 28 and ultimately the extreme end approaches the adjacent apex. At this time spring member 40 is flexed in the position as substantially shown in Fig. 2. Upon continued rotation, the bend line 42 clears the apex adjacent thereto, and then the extreme end of the wall 45 snaps past the apex with which it contacts. Inasmuch as the member 40 is under tension it snaps quickly from substantially the Fig. 2 position to the Fig. 3 position, the extreme end of the portion 45 moving quickly along one of the walls 27 in substantially sealed relation, while the wall portion 43 moves into overlapping relation with the next adjacent wall 27.

When the parts are in the position shown in Fig. 2, a chamber A is provided which is defined by the wall portions 43 and 45 of the member 40, and the adjacent wall portions 27 and 28 of the corrugated member. Now this chamber A communicates through the opening 28 to a chamber B closed off by the contact points 26. Thus a section C of the filtering medium, defined by the contact points 26, forms a wall of the chamber B. When the wiping member snaps off the apex, the chamber A is suddenly collapsed and the liquid is forced through the opening 28, the chamber B, and out through the section C of the filtering medium. This forcing of the liquid blows off, so to speak, the deposit of material on the outside of the screen on this section. These deposits may then fall by gravity and collect in the bottom of the shell 2, and the same may be removed from time to time through the opening closed by the clean-out plug 12.

The extraneous material is carried into the cleaner and up against the screen in small dispersed particles, but as they deposit upon the screen these particles more or less coalesce into large bodies somewhat in the form of a plastic mass, probably held together by the fact that the particles are wet with the liquid; and the larger plastic masses instead of being again forced up against the screen by the flow of the liquid, fall by reason of their larger mass and weight to the bottom of the shell. Thus it will be seen, as the shaft 31 is rotated, that the filtering medium is cleaned a section at a time, and this may be carried out while the device is in operation. The walls 43 and 45 extend substantially throughout the length of the filtering medium. Accordingly, when in the position shown in Fig. 3 the wall 45 substantially seals one of the openings 28 so that the flow of fluid in through the section of the filtering medium which has just been cleaned is minimized, or substantially stopped, and this factor may aid in preventing the substance which has just been forced from this section of the medium from being forced back on to the screen.

In the modified form shown in Fig. 4 separate wall members 50 are provided in place of the corrugated member. In this form a chamber D is provided defined in part by a section of the medium, and this chamber is partially collapsed as the spring element 40 snaps past one of the walls, and a liquid is forced through said section of the medium in a reverse direction to force the deposits on the outside thereof off the filtering medium.

As shown herein, the device is arranged to be hand operated by turning the handle 33. Such an arrangement may be used where desirable, as for example, on fuel tanks for oil burners or the like, and the handle may be turned occasionally, as for example, when the tank is filled or inspected. Where used on other machines, such as internal combustion engines or commercial grinding or metal working machines, the cleaner may be automatically operated periodically in connection with the operation of the machine.

It has been found that where this device has been used with an extremely dirty and contaminated lubricating oil that large masses of extraneous material may be allowed to develop on the filtering medium, and that upon operation of the cleaning arrangement such deposits are forced off and collect in the bottom of the shell. Subsequent inspection of the device has shown that the outside of the screen has been effectively cleaned and all deposits not only forced from the surfaces but forced out of the interstices. Accordingly, it will be noted that the device may be used indefinitely without replacement or without cleaning save for the fact that the deposits may be removed as required from the bottom of the shell 2.

I claim:

1. A filter for liquids comprising, a filtering medium through which liquid flows, a series of wall members on the outgoing side of the medium substantially dividing the medium into sections, a spring actuated member on the outgoing side of the medium arranged to contact with the wall members, means for causing relative movement between the spring actuated member and the wall members whereby the spring actuated member wipes across the wall members, said spring actuated member being successively tensioned and released as it wipes across the wall members, said spring actuated member having angularly disposed portions arranged to cooperate with the wall members when the member is tensioned to define a compartment, the tension of the spring actuated member serving to collapse the compartment as the spring actuated member wipes across the top of a wall, whereby to force some of the liquid entrapped in the compartment through the medium in a direction reverse to the normal flow therethrough.

2. A filter for liquids comprising, a filtering medium through which liquid flows, a series of angularly disposed wall members on the outgoing side of the medium serving to substantially divide the medium into sections, a spring actuated member arranged to wipe across the walls and to be successively flexed and released thereby, said spring actuated member having angularly disposed portions adjacent its wiping edge and arranged to define, together with adjacent walls, a compartment when the member is flexed with one portion substantially sealing against the top of one wall and the other portion substantially sealing against the top of the adjacent wall, said spring actuated member serving to substantially collapse the compartment as it is released by a wall in the wiping action, whereby to force liquid entrapped in said compartment through a section of the medium in a direction reverse to the normal flow of liquid therethrough.

3. A filter for liquids comprising, a filtering medium through which liquid flows, a series of wall-like members on the outgoing side of the medium substantially dividing the medium into sections, and a single spring actuated member arranged to wipe across the walls and to be successively flexed and released thereby, said spring actuated member having angularly disposed portions which cooperate with adjacent walls to form a compartment when the member is flexed, which compartment is substantially collapsed by spring action as the member wipes across a wall to thereby force the liquid through a section of the medium in a direction reverse to the normal flow of liquid therethrough.

4. A filter for liquids comprising, a filtering medium through which liquid flows, a series of wall-like members on the outgoing side of the medium substantially dividing the medium into sections, a wiping member composed of spring metal, means engaging the wiping member substantially at one edge causing the same to traverse said walls, the opposite edge of the wiping member having a V-bend formation providing two angular portions, and the extreme edge of said member arranged to wipe across said walls, said two portions cooperating with walls to define a chamber when the member is flexed, and said spring wiping member, by its inherent spring action, serving to collapse said chamber as its extreme edge wipes over a wall whereby to collapse said chamber and force liquid entrapped therein through a section of the medium defined by adjacent walls in a direction reverse to the normal flow of liquid therethrough.

5. A filter for liquids comprising, a casing, a cylindrically shaped filtering medium within the casing, said casing having an inlet leading to the outside of the medium and an outlet leading from the inside of the medium, the ends of the cylindrical medium being closed, a series of wall-like members extending around the inside of the medium and serving to substantially divide the same into sections, a rotary member disposed substantially on the axis of the cylindrical medium, and a spring actuated plate-like member operatively connected to the rotary member and arranged to wipe across the said walls to be successively flexed and released thereby, said member having a V-formation adjacent its wiping end which provides angularly disposed portions which cooperate with adjacent walls when the member is flexed to define a compartment and which compartment is substantially collapsed as the member wipes across a wall whereby liquid is forced from said compartment through a section of the medium, with the flow from the inside of the medium to the outside thereof.

6. A filter for liquids comprising, a casing a cylindrically shaped filtering medium within the casing, said casing having an inlet leading to the outside of the medium and an outlet leading from the inside of the medium, the ends of the cylindrical medium being closed, a series of wall-like members extending around the inside of the medium and serving to substantially divide the same into sections, a rotary member disposed substantially on the axis of the cylindrical medium, a spring metal plate attached to the rotary member and arranged to wipe across said walls and to be successively flexed and released thereby, said plate, adjacent its wiping edge, having angularly disposed portions which cooperate with adjacent walls when the member is flexed to define a compartment, said plate-like member collapsing the compartment by its spring action when the same wipes past a wall to substantially collapse the compartment, whereby to force fluid entrapped in said compartment through a section of the medium, with the fluid flowing from the inside of the cylindrical medium to the outside thereof.

7. A filter for liquids comprising, a casing having an inlet and an outlet, a cylindrically shaped filtering medium in the casing having its ends closed, and located so that the inlet communicates to the outside of the medium and the outlet to the inside thereof, a series of wall-like members extending around the inside of the medium and substantially dividing the medium into sections, a spring metal plate within the medium, means for causing relative rotation between the plate on the one hand and the walls and medium on the other, whereby the plate wipes across the walls and is successively flexed and released thereby, said spring metal plate having angularly disposed portions adjacent its wiping edge which cooperate with adjacent walls when the plate is flexed to form a compartment, said plate substantially collapsing the compartment by its spring action as it wipes across a wall whereby liquid entrapped in the compartment is forced through a section of the medium in a direction from the inside of the medium to the outside thereof.

8. A filter for liquids comprising, a filtering medium through which liquid flows, a series of wall-like members on the outgoing side of the medium substantially dividing the medium into sections, and a single spring actuated member arranged to wipe across the walls and to be successively flexed and released thereby, said spring actuated member having portions arranged to cooperate with adjacent walls to form a compartment when the member is flexed, which compartment is substantially collapsed by spring action as the member wipes across a wall to thereby force some of the liquid through a section of the medium in a direction reverse to the normal flow of liquid therethrough.

EDWARD L. WOOD.